United States Patent
Linton et al.

(10) Patent No.: US 11,180,238 B2
(45) Date of Patent: Nov. 23, 2021

(54) SHEAR TIES FOR AIRCRAFT WING

(71) Applicant: The Boeing Company, Chicago, IL (US)

(72) Inventors: Kim A. Linton, Garden Grove, CA (US); Jaime E. Baraja, San Pedro, CA (US); Hsi-Yung T. Wu, Cypress, CA (US)

(73) Assignee: The Boeing Company, Chicago, IL (US)

( * ) Notice: Subject to any disclaimer, the term of this patent is extended or adjusted under 35 U.S.C. 154(b) by 378 days.

(21) Appl. No.: 16/195,310

(22) Filed: Nov. 19, 2018

(65) Prior Publication Data
US 2020/0156759 A1 May 21, 2020

(51) Int. Cl.
*B64C 3/26* (2006.01)
*B64F 5/10* (2017.01)
(Continued)

(52) U.S. Cl.
CPC .............. *B64C 3/26* (2013.01); *B64C 3/182* (2013.01); *B64C 3/52* (2013.01); *B64F 5/10* (2017.01)

(58) Field of Classification Search
CPC .......... B64C 3/182; B64C 3/187; B64C 1/12; B64C 3/20; B64C 3/26; B64C 3/52;
(Continued)

(56) References Cited

U.S. PATENT DOCUMENTS 2,392,788 A * 1/1946 Watter ..................... B64C 3/00
244/117 R
4,186,535 A * 2/1980 Morton .................... E04B 1/24
52/250

(Continued)

FOREIGN PATENT DOCUMENTS

EP 2 965 984 1/2016
WO WO 2015/015152 2/2015

OTHER PUBLICATIONS

Aymerich, et al. "Analysis of the effect of stitching on the fatigue strength of single-lap composite joints", Composites Science and Technology, vol. 66, No. 2, Feb. 1, 2006, pp. 166-175.
(Continued)

*Primary Examiner* — Medhat Badawi
(74) *Attorney, Agent, or Firm* — McDonnell Boehnen Hulbert & Berghoff LLP

(57) ABSTRACT

An example aircraft wing includes a skin, a composite shear tie, a stringer base charge overlaying the skin, and a stringer overlaying the stringer base charge. The composite shear tie includes a shear-tie web, a first shear-tie flange extending from a first side of the shear-tie web, a second shear-tie flange extending from a second side of the shear-tie web, and a first shear-tie tab extending from an end of the first side of the shear-tie web. The stringer includes a stringer web, a first stringer flange extending from a first side of the stringer web, and a second stringer flange extending from a second side of the stringer web. The first stringer flange is stitched to and integrated with the stringer base charge and the skin.

(Continued)

Further, the first shear-tie flange is stitched to and integrated with the first stringer flange.

20 Claims, 12 Drawing Sheets

(51) Int. Cl.
*B64C 3/18* (2006.01)
*B64C 3/52* (2006.01)

(58) Field of Classification Search
CPC .............. B64F 5/10; Y10T 428/24033; Y10T 428/24174; Y10T 428/24198; Y10T 50/40
See application file for complete search history.

(56) References Cited

U.S. PATENT DOCUMENTS

| | | | | |
|---|---|---|---|---|
| 4,210,694 A * | 7/1980 | Fogg, III | ................ | B29C 53/04 428/174 |
| 4,228,976 A * | 10/1980 | Eiselbrecher | ............. | B64C 1/26 244/131 |
| 4,310,132 A * | 1/1982 | Frosch | ................... | B64C 1/068 244/119 |
| 5,216,799 A * | 6/1993 | Charnock | ................. | B64C 3/18 244/133 |
| 5,242,523 A * | 9/1993 | Willden | ............. | B29D 99/0014 156/285 |
| 5,307,601 A * | 5/1994 | McCracken | ............... | E04C 3/07 52/364 |
| 5,405,107 A * | 4/1995 | Bruno | ...................... | B64C 1/36 244/117 R |
| 5,893,534 A * | 4/1999 | Watanabe | ............... | B64C 1/064 244/119 |
| 5,939,007 A * | 8/1999 | Iszczyszyn | ........... | B29C 70/342 264/258 |
| 5,963,660 A * | 10/1999 | Koontz | ................. | G01N 21/88 156/64 |
| 6,012,883 A * | 1/2000 | Engwall | ............... | B29C 70/342 409/132 |
| 6,013,341 A * | 1/2000 | Medvedev | ............... | E04B 1/36 428/114 |
| 6,045,651 A * | 4/2000 | Kline | .................... | B29C 70/342 156/285 |
| 6,112,792 A * | 9/2000 | Barr | ........................ | B29C 70/32 156/441 |
| 6,114,012 A * | 9/2000 | Amaoka | ................. | B29C 70/30 244/119 |
| 6,155,450 A * | 12/2000 | Vasiliev | ................ | B29C 53/587 220/589 |
| 6,187,411 B1 * | 2/2001 | Palmer | .................. | B29C 70/543 428/102 |
| 6,190,484 B1 * | 2/2001 | Appa | ...................... | B29C 70/32 156/189 |
| 6,355,337 B1 * | 3/2002 | Piening | .................... | B64C 3/20 428/223 |
| 6,386,481 B1 * | 5/2002 | Kallinen | ................. | B64C 3/18 244/123.1 |
| 6,415,496 B1 * | 7/2002 | Dominguez Casado | .................... | B64C 1/06 29/525.01 |
| 6,776,371 B2 * | 8/2004 | Tanaka | ...................... | B64C 3/20 156/182 |
| 6,889,937 B2 * | 5/2005 | Simpson | ................ | B29C 70/44 244/123.1 |
| 7,325,771 B2 * | 2/2008 | Stulc | .................... | B64C 1/1492 244/119 |
| 7,380,753 B2 * | 6/2008 | Kairouz | ................. | B64C 1/06 244/123.1 |
| 7,635,106 B2 | 12/2009 | Pham et al. | | |
| 7,681,835 B2 * | 3/2010 | Simpson | ................... | B64C 3/20 244/123.3 |
| 7,850,118 B2 * | 12/2010 | Vichniakov | ............... | B64C 1/12 244/123.3 |
| 8,056,859 B2 * | 11/2011 | Kunichi | .................. | B21J 15/14 244/123.1 |
| 8,096,504 B2 | 1/2012 | Arevalo et al. | | |
| 9,096,305 B2 * | 8/2015 | Kehrl | ................ | B29D 99/0003 |
| 10,046,525 B2 | 8/2018 | Forston et al. | | |
| 10,252,822 B2 * | 4/2019 | Conversano | .............. | B64F 5/10 |
| 10,308,345 B2 * | 6/2019 | Marks | ..................... | B64C 3/182 |
| 2001/0051251 A1 * | 12/2001 | Noda | ...................... | B29C 70/04 428/119 |
| 2002/0000492 A1 * | 1/2002 | Schmidt | ................. | B23K 31/02 244/125 |
| 2002/0081415 A1 * | 6/2002 | Toi | ............................ | B64C 1/12 428/102 |
| 2002/0134889 A1 * | 9/2002 | Schmidt | .................... | B64C 1/12 244/133 |
| 2005/0241358 A1 * | 11/2005 | Kaye | ......................... | B64F 5/10 72/379.2 |
| 2008/0111024 A1 * | 5/2008 | Lee | .......................... | B64C 1/068 244/121 |
| 2008/0173757 A1 * | 7/2008 | Tanner | ..................... | B64C 3/26 244/119 |
| 2008/0223987 A1 * | 9/2008 | Halme | ................. | B64C 3/187 244/123.1 |
| 2009/0200425 A1 * | 8/2009 | Kallinen | ................... | B64C 1/26 244/131 |
| 2009/0317587 A1 * | 12/2009 | Deobald | ................... | B32B 3/04 428/119 |
| 2010/0025529 A1 * | 2/2010 | Perry | ..................... | B29C 65/562 244/117 R |
| 2010/0148008 A1 * | 6/2010 | Hernando Sebastian | .................... | B64C 3/187 244/131 |
| 2010/0170988 A1 * | 7/2010 | Meyer | .................. | B64C 1/068 244/120 |
| 2010/0272954 A1 * | 10/2010 | Roming | .................. | B64C 1/064 428/138 |
| 2010/0308172 A1 * | 12/2010 | Depeige | ................ | B64C 1/1461 244/132 |
| 2011/0001010 A1 * | 1/2011 | Tacke | ..................... | B64C 1/069 244/131 |
| 2011/0284687 A1 * | 11/2011 | Parker | ..................... | B64C 1/26 244/99.5 |
| 2012/0006940 A1 * | 1/2012 | Mialhe | ..................... | B64C 1/12 244/117 R |
| 2012/0074265 A1 * | 3/2012 | Hallander | ................ | B29C 65/02 244/90 R |
| 2012/0100343 A1 * | 4/2012 | Borghini-Lilli | ......... | B29C 70/30 428/156 |
| 2012/0132748 A1 * | 5/2012 | Axford | ..................... | B64C 3/26 244/119 |
| 2012/0217352 A1 * | 8/2012 | Gya | ..................... | H02G 3/0487 248/49 |
| 2012/0308770 A1 * | 12/2012 | Eli-Eli | ..................... | B64C 1/064 428/120 |
| 2013/0001360 A1 * | 1/2013 | Wildman | ................... | B64C 3/28 244/123.1 |
| 2013/0099058 A1 * | 4/2013 | Payne | .................. | B29C 70/887 244/123.1 |
| 2013/0101801 A1 * | 4/2013 | Honorato Ruiz | ....... | B64C 1/064 428/167 |
| 2013/0119191 A1 * | 5/2013 | Wolfe | ................... | B29C 51/12 244/54 |
| 2013/0344291 A1 * | 12/2013 | Pearson | ................. | B29C 70/545 428/157 |
| 2014/0113107 A1 * | 4/2014 | Kremer | ..................... | B64C 1/06 428/121 |
| 2014/0138485 A1 * | 5/2014 | Sanderson | ................ | B64C 3/20 244/123.1 |
| 2014/0166811 A1 * | 6/2014 | Roming | ................. | B64C 1/12 244/131 |
| 2014/0216638 A1 * | 8/2014 | Vetter | ................... | B29C 70/081 156/227 |
| 2014/0224043 A1 * | 8/2014 | Tighe | ................... | B64C 3/187 73/865.8 |

(56) References Cited

U.S. PATENT DOCUMENTS

| | | | | |
|---|---|---|---|---|
| 2015/0125655 A1* | 5/2015 | Kajita | ................ | B32B 3/266 |
| | | | | 428/136 |
| 2015/0183506 A1* | 7/2015 | Garcia Martin et al. | ................ | |
| | | | | B29C 70/443 |
| | | | | 244/123.1 |
| 2015/0329197 A1* | 11/2015 | Seack | ................ | B64C 3/185 |
| | | | | 244/123.7 |
| 2016/0009061 A1* | 1/2016 | Marks | ................ | B29C 53/043 |
| | | | | 156/212 |
| 2016/0009365 A1* | 1/2016 | Marks | ................ | B64C 3/18 |
| | | | | 244/123.1 |
| 2016/0009366 A1* | 1/2016 | Marks | ................ | B29C 53/04 |
| | | | | 244/123.1 |
| 2016/0009367 A1* | 1/2016 | Marks | ................ | B64C 3/26 |
| | | | | 244/45 R |
| 2016/0107432 A1* | 4/2016 | Krajca | ................ | B26D 1/04 |
| | | | | 156/250 |
| 2016/0176499 A1* | 6/2016 | Evans | ................ | B64C 3/18 |
| | | | | 244/123.1 |
| 2017/0057615 A1* | 3/2017 | Charles | ................ | B32B 5/024 |
| 2017/0240299 A1* | 8/2017 | Conversano | ................ | B64C 3/26 |
| 2018/0086429 A1* | 3/2018 | Sheppard | ................ | B64C 9/00 |
| 2018/0093431 A1* | 4/2018 | Forston | ................ | B32B 5/26 |
| 2020/0156759 A1* | 5/2020 | Linton | ................ | B64C 3/52 |

OTHER PUBLICATIONS

Extended European Search Report prepared by the European Patent Office in application No. EP 19 20 9354.0 dated Mar. 23, 2020.
Karal, Michael, AST Composite Wing Program—Executive Summary, Mar. 2001, available at https://ntrs.nasa.gov/archive/nasa/casi.ntrs.nasa.gov/20010033249.pdf.

* cited by examiner

SHEAR TIES FOR AIRCRAFT WING

FIELD

The present disclosure relates generally to aircraft wings, and more particularly, to assemblies for connecting a rib of an aircraft wing to a skin of the aircraft wing.

BACKGROUND

Composite materials are increasingly used as substitutes for conventional materials, such as aluminum and steel alloys, in various structural components due to the generally high strength-to-weight ratio inherent in composite materials. For instance, composite parts are presently used as parts for aircrafts. Composite materials generally include a network of reinforcing fibers that are applied in layers, referred to as plies, and a resin that substantially wets the reinforcing fibers to form an intimate contact between the resin and the reinforcing fibers.

Designs for some aircraft wings employ composite structural components in the aircraft wing, such as ribs, spars, and stringers. The internal structure of an aircraft wing can include spars and stringers, that run along a length of the aircraft wing from a fuselage of the aircraft to the tip of the aircraft wing, and ribs that are oriented chordwise (i.e. from a leading edge of the aircraft wing to the trailing edge of the aircraft wing). Spars are located at the front and rear of the wing box and are attached to an upper skin and a lower skin. The stringers can support the upper skin and the lower skin, and give shape to the aircraft wing. Ribs support the upper skin and the lower skin. These ribs can be attached to the upper skin and the lower skin using components referred to as shear ties. Due to loads experienced by the aircraft wing during flight and on the ground, the ribs can either be pushed or pulled away from the upper skin and the lower skin.

SUMMARY

In one example, an assembly for connecting a rib of an aircraft wing to a skin of the aircraft wing is described. The assembly includes a composite shear tie, a stringer base charge overlaying the skin, and a stringer overlaying the stringer base charge. The composite shear tie has a shear-tie web, a first shear-tie flange extending from a first side of the shear-tie web, a second shear-tie flange extending from a second side of the shear-tie web, and a first shear-tie tab extending from an end of the first side of the shear-tie web. The stringer includes a stringer web, a first stringer flange extending from a first side of the stringer web, and a second stringer flange extending from a second side of the stringer web. The first stringer flange is stitched to and integrated with the stringer base charge and the skin. Further, the first shear-tie flange is stitched to and integrated with the first stringer flange.

In another example, an aircraft wing is described. The aircraft wing includes a skin, a composite shear tie, a stringer base charge overlaying the skin, and a stringer overlaying the stringer base charge. The composite shear tie includes a shear-tie web, a first shear-tie flange extending from a first side of the shear-tie web, a second shear-tie flange extending from a second side of the shear-tie web, and a first shear-tie tab extending from an end of the first side of the shear-tie web. The stringer includes a stringer web, a first stringer flange extending from a first side of the stringer web, and a second stringer flange extending from a second side of the stringer web. The first stringer flange is stitched to and integrated with the stringer base charge and the skin. Further, the first shear-tie flange is stitched to and integrated with the first stringer flange.

In another example, a method of fabricating and assembling an aircraft wing is described. The method includes integrating a stringer base charge with a skin of the aircraft wing during a co-curing process. The method also includes integrating a stringer with the stringer base during the co-curing process, the stringer including a stringer web, a first stringer flange extending from a first side of the stringer web, and a second stringer flange extending from a second side of the stringer web. Further, the method includes integrating a first shear-tie flange of a composite shear to the first stringer flange during the co-curing process. Still further, the method includes, after the co-curing process, fastening a composite rib to a shear-tie web of the composite shear tie.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

DETAILED DESCRIPTION

Figure 1:
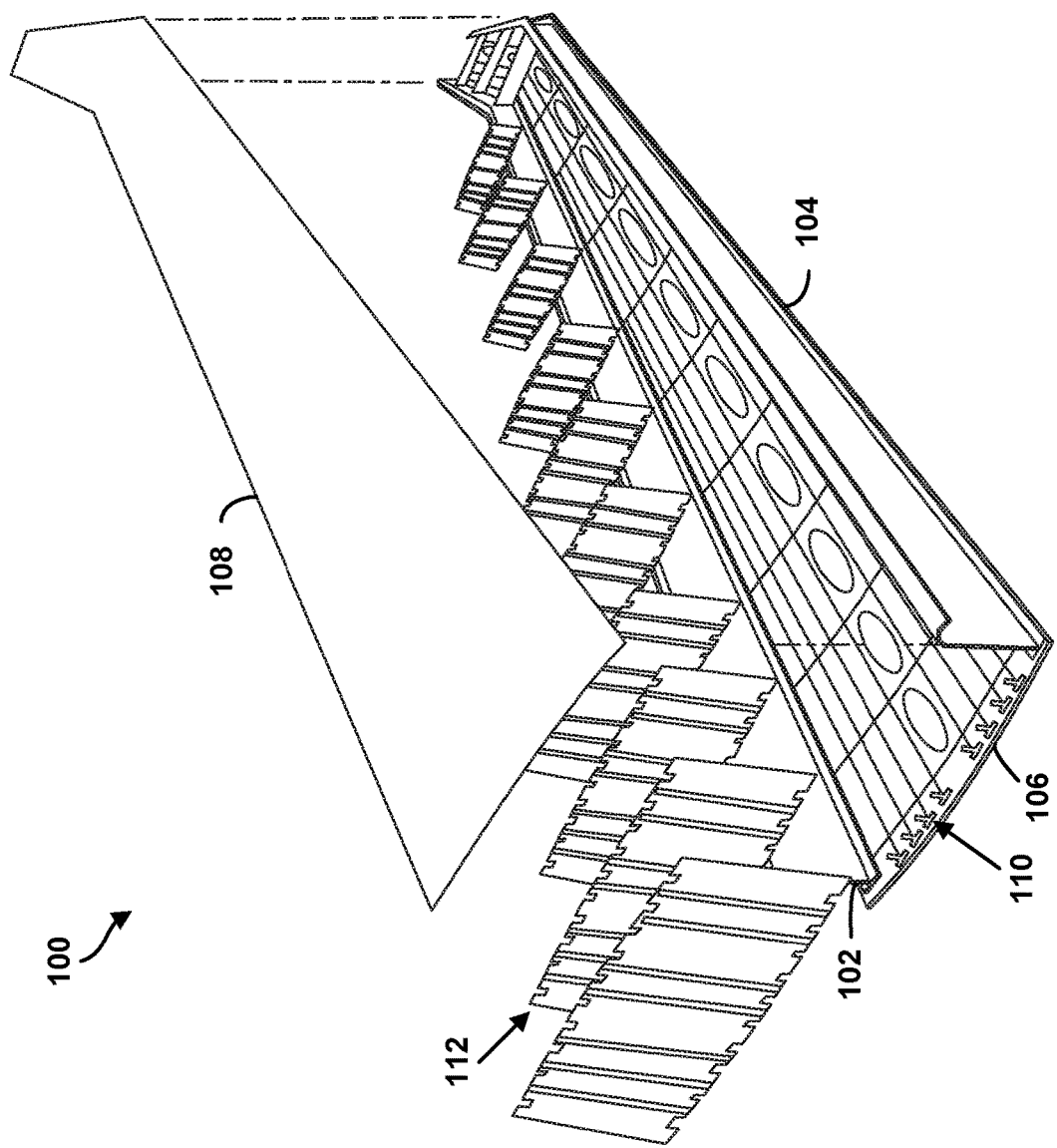
FIG. 1 illustrates an aircraft wing, according to an example.

Disclosed examples will now be described more fully hereinafter with reference to the accompanying figures, in which some, but not all of the disclosed examples are shown.

Indeed, several different examples may be provided and should not be construed as limited to the examples set forth herein. Rather, these examples are provided so that this disclosure will be thorough and complete and will fully convey the scope of the disclosure to those skilled in the art.

Described herein are assemblies for connecting a rib of an aircraft wing to a skin of the aircraft wing as well as methods for assembling aircraft wings. An example assembly includes a stringer base charge, a stringer overlaying the stringer base charge, and a composite shear tie. The stringer base charge is stitched to and integrated with the skin. The skin can be an upper skin that is in compression during level flight or a lower skin that is in tension during level flight. Further, the stringer includes a stringer web, a first stringer flange extending from a first side of the stringer web, and a second stringer flange extending from a second side of the stringer web.

The composite shear tie includes a shear-tie web, a first shear-tie flange extending from a first side of the shear-tie web, a second shear-tie flange extending from a second side of the shear-tie web, a first shear-tie tab extending from an end of the first side of the shear-tie web, and a second shear-tie tab extending from the same end of the second side of the shear-tie web. The first shear-tie flange is stitched to and integrated with the first stringer flange, thereby increasing the amount of force required to pull the composite shear-tie off. For instance, at an intersection of the first shear-tie flange and the first stringer flange, the first shear-tie flange and the first stringer flange can be stitched together.

Stitching the first shear-tie flange and the first stringer flange together makes it possible to integrate the first shear-tie flange with the first stringer flange during a co-curing process so composite ribs can be used weight efficiently. Instead of bolting on aluminum ribs, the stitched composite shear tie and the stringer can be cured together at the same time. The co-curing process can include inserting the composite shear tie and the stringer within an oven after stitching the first shear-tie flange to the first stringer flange, such that the composite shear tie and the stringer can be co-cured at the same time within the oven. Without the stitching and the co-curing, fasteners might instead be used to attach the first shear-tie flange to the first stringer flange and the skin. The co-curing process can make the aircraft wing less susceptible to electromagnetic effects, such as those from lightning strikes, since stitching can eliminate the need for using fasteners between components that are co-cured and are exposed to pull-off forces. Bolting aluminum ribs with fasteners exposed to the outer mold line of the aircraft wing creates a direct path for the current from a lightning strike into a wing fuel tank. Bolting the rib webs to the shear ties with fasteners totally isolated from the outer mold line keeps the current in the skin, and out of the fuel tank. Another advantage of the assemblies described herein is that the assemblies allow for the integration of a weight-efficient rib web that attaches in a vertical interface, thereby eliminating the use of shims that are used with an aluminum rib having a perpendicular interface to the skin.

Co-curing components of the aircraft wing can also reduce manufacturing time and costs. Further, in some examples, other components of the aircraft wing can also be co-cured with the composite shear tie and the stringer, such as the stringer base charge and the skin. Co-curing additional components with the composite shear tie and the stringer can further reduce manufacturing time and costs.

In some examples, the first shear-tie tab can be stitched to and integrated with the first side of the stringer web, thereby stabilizing the stringer web and further increasing the amount of force required to pull the composite shear-tie off of the stringer. Further, the first shear-tie tab can also overlap the first shear-tie flange at the intersection between the first shear-tie flange and the first stringer flange. This overlapping can further increase the pull off load capability of the shear tie.

Similarly, a portion of the first shear-tie flange that does not intersect the first stringer flange can be stitched to and integrated with the skin, thereby strengthening a bond between the composite shear tie and the skin. For example, a portion of the first shear-tie flange that is provided between the stringer and another stringer can be stitched to and integrated with the skin.

Further, the assembly can also include a tear strap stitched to and integrated with the skin. The composite shear tie can overlay the tear strap, with the first shear-tie flange and the second shear-tie flange being stitched to and integrated with the tear strap. With this arrangement, the tear strap that is stitched can help prevent cracks within the skin from spreading. For instance, the tear strap can prevent the crack from spreading from a first side of the composite shear tie to a second side of the composite shear tie.

Various other features and variations of the described systems, as well as corresponding methods, are described hereinafter with reference to the accompanying figures.

Referring now to FIG. 1, FIG. 1 illustrates an aircraft wing 100, according to an example. As shown in FIG. 1, aircraft wing 100 includes a rear spar 102, a front spar 104, a lower skin 106, an upper skin 108, a plurality of stringers 110, and a plurality of ribs 112. Rear spar 102, front spar 104, lower skin 106, upper skin 108, plurality of stringers 110, and plurality of ribs 112 can be made from a same or different composite material. A composite material is two or more constituent materials with different physical or chemical properties. The composite material may be a non-crimp fabric composite. The composite material may include a graphite composite, for instance, or a carbon fiber composite.

Figure 2:
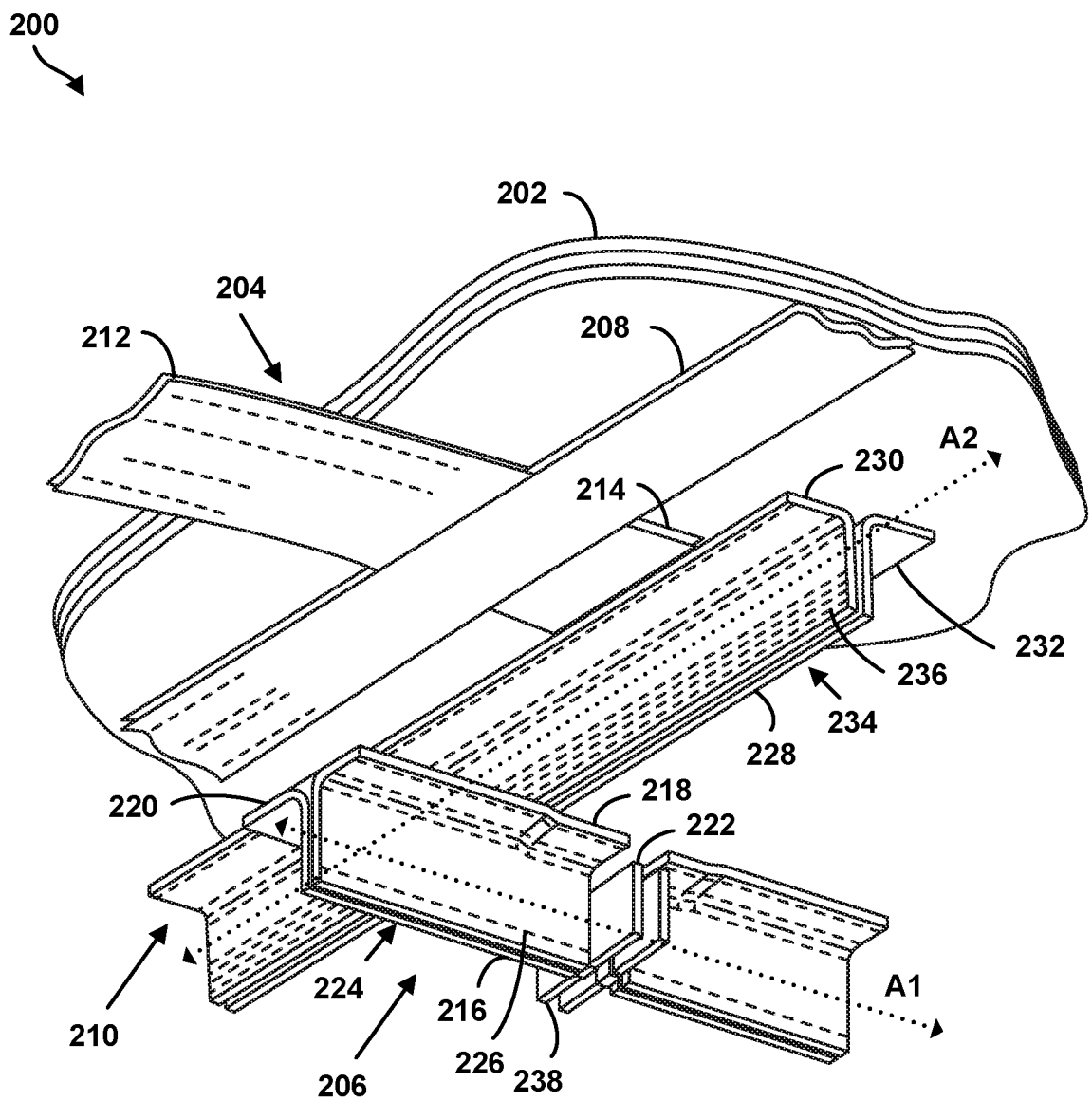
FIG. 2 illustrates a partial view of an assembly for connecting a rib of an aircraft wing to a skin of an aircraft wing, according to an example.

In line with the discussion above, individual ribs of plurality of ribs 112 can be connected to lower skin 106 and upper skin 108 using shear ties. FIG. 2 illustrates a partial view of an assembly 200 for connecting a rib of an aircraft wing to a skin 202 of the aircraft wing, according to an example. Assembly 200 can, for example, be used for connecting a rib of plurality of ribs 112 of FIG. 1 to lower skin 106 or upper skin 108. As shown in FIG. 2, assembly 200 includes a discontinuous base charge 204, a composite shear tie 206, a stringer base charge 208, and a stringer 210.

Discontinuous base charge 204 can help react the spring back forces created by the shear-tie flanges to maintain a smooth-lofted surface (skin 202). As shown in FIG. 2, discontinuous base charge 204 includes a first section 212 and a second section 214 that are separated by the stringer base charge 208. With this arrangement, the stringer base charge 208 can be in direct contact with skin 202 eliminating any joggles along a length of stringer base charge 208, thereby increasing a compression capability of stringer 210. Increasing the compression capability of stringer 210 may be beneficial when skin 202 is an upper skin, since an upper skin can experience significant compression loads during flight.

Composite shear tie 206 includes a shear-tie web 216, a first shear-tie flange 218 extending from a first side of shear-tie web 216, a second shear-tie flange 220 extending from a second side of shear-tie web 216, and a first shear-tie tab 222 extending from an end of first side of shear-tie web 216. First shear-tie flange 218 and second shear-tie flange 220 can be stitched to and integrated with discontinuous base charge 204 along a length of composite shear tie 206, thereby allowing for co-curing of composite shear tie 206 with discontinuous base charge 204 and with skin 202.

Shear-tie web 216 includes a plurality of shear-tie web plies 224, and includes through-thickness stitching 226 provided along a length of shear-tie web 216 hrough-thickness stitching 226 can hold plurality of shear-tie web plies 224 together, which can reinforce shear-tie web 216 and help prevent individual shear-tie web plies of plurality of shear-tie web plies 224 from separating from one another.

Stringer 210 includes a stringer web 228, a first stringer flange 230 extending from a first side of the stringer web 228, and a second stringer flange 232 extending from a second side of stringer web 228. First stringer flange 230 and second stringer flange 232 can be stitched to and integrated with stringer base charge 208 and skin 202 along a length of stringer 210.

Stringer web 228 includes a plurality of stringer web plies 234, and includes through-thickness stitching 236 provided along a length of stringer web 228. Through-thickness stitching 236 can hold plurality of stringer web plies 234 together, which can reinforce stringer web 228 and help prevent individual stringer web plies of plurality of stringer web plies 234 from separating from one another. On the compression dominated skin panels, this through-thickness stitching 236 contains any barely visible impact damage that might go undetected from growing under these compression loads. This allows stringer 210 to work at higher strain levels than would otherwise be possible and therefore saves weight.

In an assembled state, a longitudinal axis A1 of composite shear tie 206 can be oblique to a longitudinal axis A2 of stringer 210. For instance, longitudinal axis A1 can be generally perpendicular to longitudinal axis A2 (e.g., an angle between longitudinal axis A1 and longitudinal axis A2 can be an angle between 80° and 100°). In other examples, the angle between longitudinal axis A1 and longitudinal axis A2 could be larger or smaller, such as between 60° and 120°. Further, in an assembled state, first shear-tie flange 218 can be stitched to first stringer flange 230. Similarly, second shear-tie flange 220 can be stitched to first stringer flange 230. Further, first shear-tie tab 222 as well as a second shear-tie tab 238 extending from a second side of shear-tie web 216 can be stitched to and integrated with stringer web 228. This increases the shear-tie pull-off capabilities as well as stabilizes stringer web 228. Stitching composite shear tie 206 to stringer 210 can allow for integrating composite shear tie 206 with stringer 210 during a co-curing process. Further, without the stitching in first shear-tie flange 218 and second shear-tie flange 220, composite shear tie 206 might not be able to react out of plane forces created by pressure loads in a wing on a weak interlaminate resin interface.

Although not shown in FIG. 2, composite shear tie 206 can also include a third shear-tie tab extending from the first side of shear-tie web 216 and a fourth shear-tie tab extending from the second side of shear-tie web 216, with the third shear-tie tab and the fourth shear-tie tab being stitched to and integrated with a stringer web of another stringer (also not shown).

Further, FIG. 2 depicts composite shear tie 206 with first shear-tie flange 218 and second shear-tie flange 220 having lengths that are longer than a width of first stringer flange 230, such that portions of first shear-tie flange 218 and second shear-tie flange 220 directly abut first section 212. However, in other examples, the lengths of first shear-tie flange 218 and second shear-tie flange 220 could be shorter. For instance, the lengths of first shear-tie flange 218 and second shear-tie flange 220 could be approximately equal to a width of first stringer flange 230, such that portions of first shear-tie flange 218 and second shear-tie flange 220 do not extend beyond the width of first stringer flange 230.

As noted above, one or more components of assembly 200 can be integrated together during a co-curing process. For instance, during a co-curing process, discontinuous base charge 204, stringer base charge 208, skin 202, first shear-tie flange 218, and first stringer flange 230 can all be stitched together and then co-cured. Co-curing a first component to a second component can involve stitching or otherwise adhering the first component to the second component, placing the two components within an oven, and curing the first component and the second component together within the oven.

Figure 3:
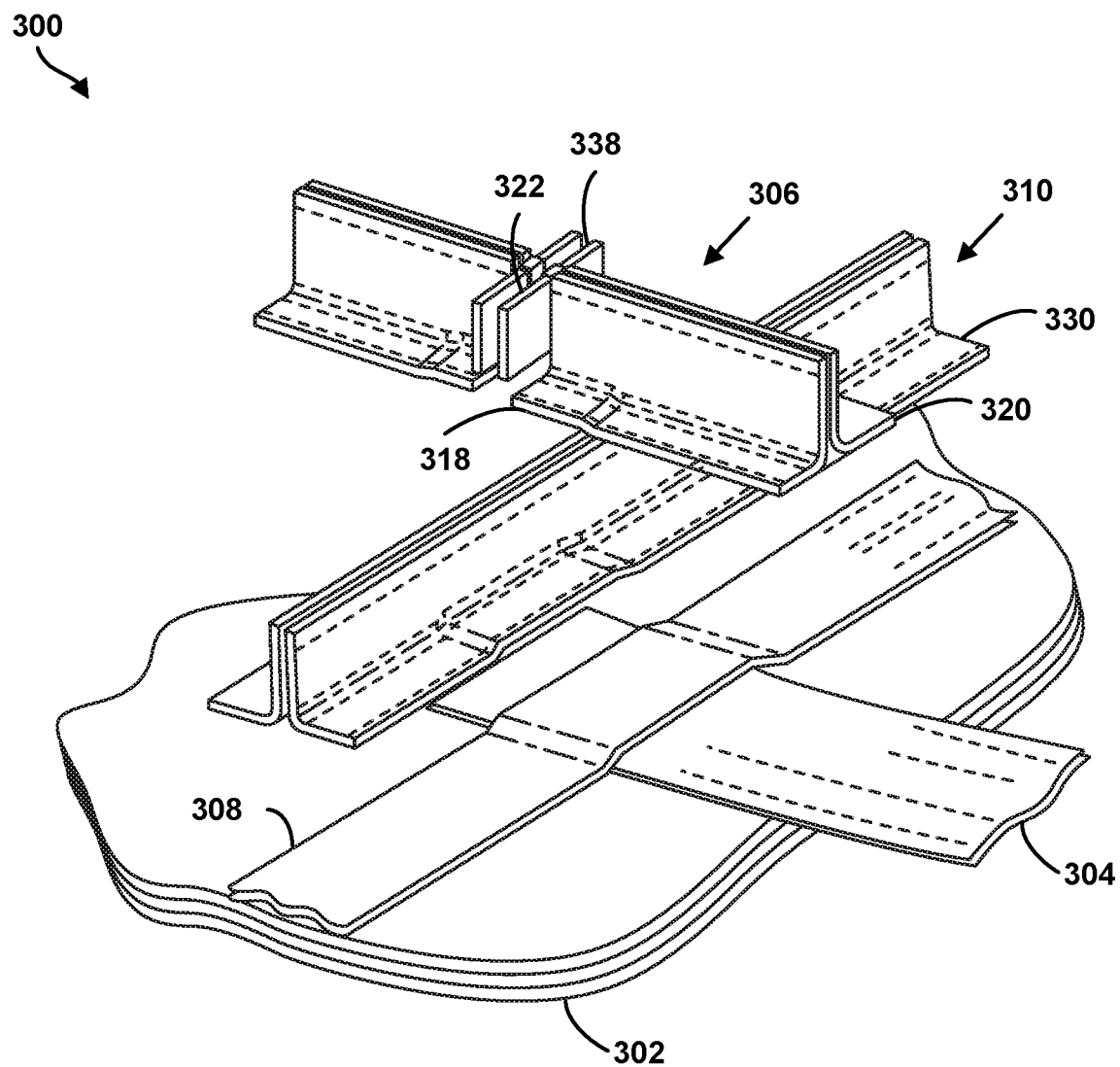
FIG. 3 illustrates a partial view of an assembly for connecting a rib of an aircraft wing to a skin of an aircraft wing, according to an example.

FIG. 3 illustrates a partial view of another assembly 300 for connecting a rib of an aircraft wing to a skin 302 of the aircraft wing, according to an example. Assembly 300 can, for example, be used for connecting a rib of plurality of ribs 112 of FIG. 1 to lower skin 106 or upper skin 108. As shown in FIG. 3, like the assembly 200 of FIG. 2, assembly 300 includes a composite shear tie 306, a stringer base charge 308, and a stringer 310. However, assembly 300 differs from assembly 200 of FIG. 2 in that assembly 300 includes a continuous tear strap 304, whereas, assembly 200 includes a discontinuous base charge 204.

Continuous tear strap 304 can include a strip of composite material that is located adjacent to skin 302. Continuous tear strap 304 can continuously run along a chord of skin 302, such as between a front spar and a rear spar. With this arrangement, stringer base charge 308 can joggle over continuous tear strap 304. This can more easily be accomplished when composite shear tie 306, stringer base charge 308, and stringer 310 are co-cured together. Further, this arrangement can improve the ability of skin 302 to withstand large-notch splitting of skin 302 under high tension loads. Overlapping tear straps under both shear ties and stringers creates a grid work of smaller bays that are able to arrest splitting in skin 302. With the shear ties, stringers, shear-tie tear strap, stringer base charge, and the skin in place, these stiffening members can all be stitched together. This can facilitate increasing the percentage of zero-degree plies in the skin, thereby reducing weight. Improving the ability of skin 302 to withstand splitting may be beneficial when skin 302 is a lower skin, since a lower skin can experience significant tension loads during flight.

Further, FIG. 3 depicts composite shear tie 306 with a first shear-tie flange 318 and second shear-tie flange 320 having lengths that are longer than a width of a first stringer flange 330, such that portions of first shear-tie flange 318 and second shear-tie flange 320 directly abut continuous tear strap 304. However, in other examples, the lengths of first shear-tie flange 318 and second shear-tie flange 320 could be shorter. For instance, the lengths of first shear-tie flange 318 and second shear-tie flange 320 could be approximately equal to a width of first stringer flange 330, such that portions of first shear-tie flange 318 and second shear-tie flange 320 do not extend beyond the width of first stringer flange 330.

Figure 4:
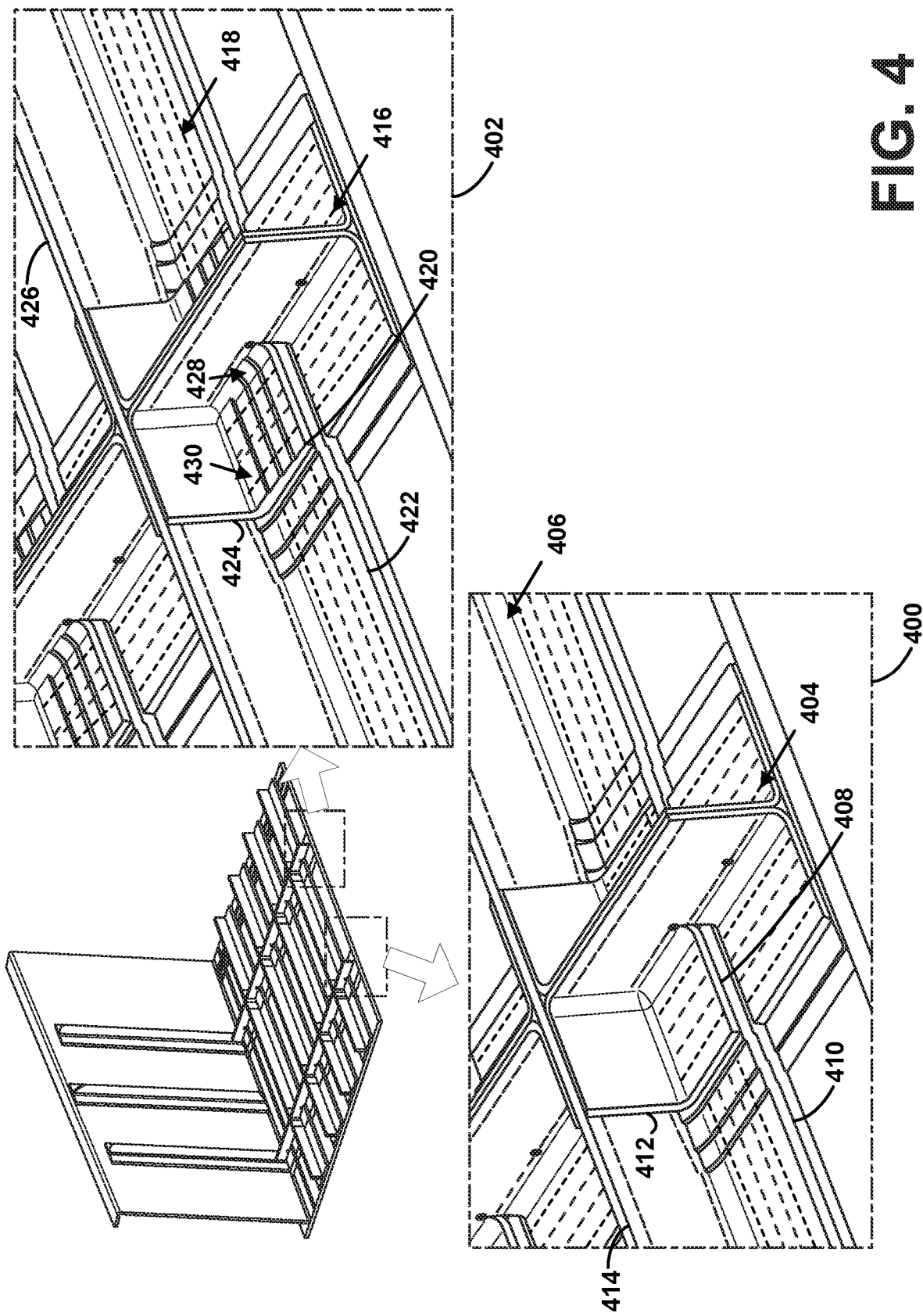
FIG. 4 illustrates two different shear-tie tab configurations, according to an example.

FIG. 4 illustrates two different shear-tie tab configurations, according to an example. More specifically, FIG. 4 depicts a first shear-tie tab configuration 400 and a second shear-tie tab configuration 402.

First shear-tie tab configuration 400 includes, among other things, a composite shear tie 404 and a stringer 406. Composite shear tie 404 can represent composite shear tie 306 of FIG. 3, for instance, and stringer 406 can represent stringer 310 of FIG. 3. As shown in FIG. 4, a first shear-tie flange 408 of composite shear tie 404 is stitched to a first stringer flange 410 of stringer 406. Further, a first shear-tie tab 412 could be stitched to a stringer web 414 of stringer 406. First shear-tie tab 412 and first shear-tie flange 408 are joined together with a butt splice.

Second shear-tie tab configuration 402 also includes, among other things, a composite shear tie 416 and a stringer 418. Composite shear tie 416 can represent composite shear tie 306 of FIG. 3, and stringer 418 can represent stringer 310 of FIG. 3. As shown in FIG. 4, a first shear-tie flange 420 of composite shear tie 416 is stitched to a first stringer flange 422 of stringer 418. Further, a first shear-tie tab 424 could be stitched to a stringer web 426 of stringer 418. First shear-tie flange 420 includes a plurality of shear-tie flange plies 428 that are interweaved with a plurality of shear-tie tab plies 430 of first shear-tie tab 424. Due to this overlap splice between first shear-tie flange 420 and first shear-tie tab 424, the amount of force required to pull composite shear tie 416 off of stringer 418 can be greater than the amount of force required to pull composite shear tie 404 off of stringer 406. Accordingly, it may be advantageous to use second shear-tie tab configuration 402 in areas of an aircraft wing that experience high pull-off loads, such as mid-wing, and to use first shear-tie tab configuration 400 in areas of an aircraft wing that experience lesser pull-off loads.

Figure 5:
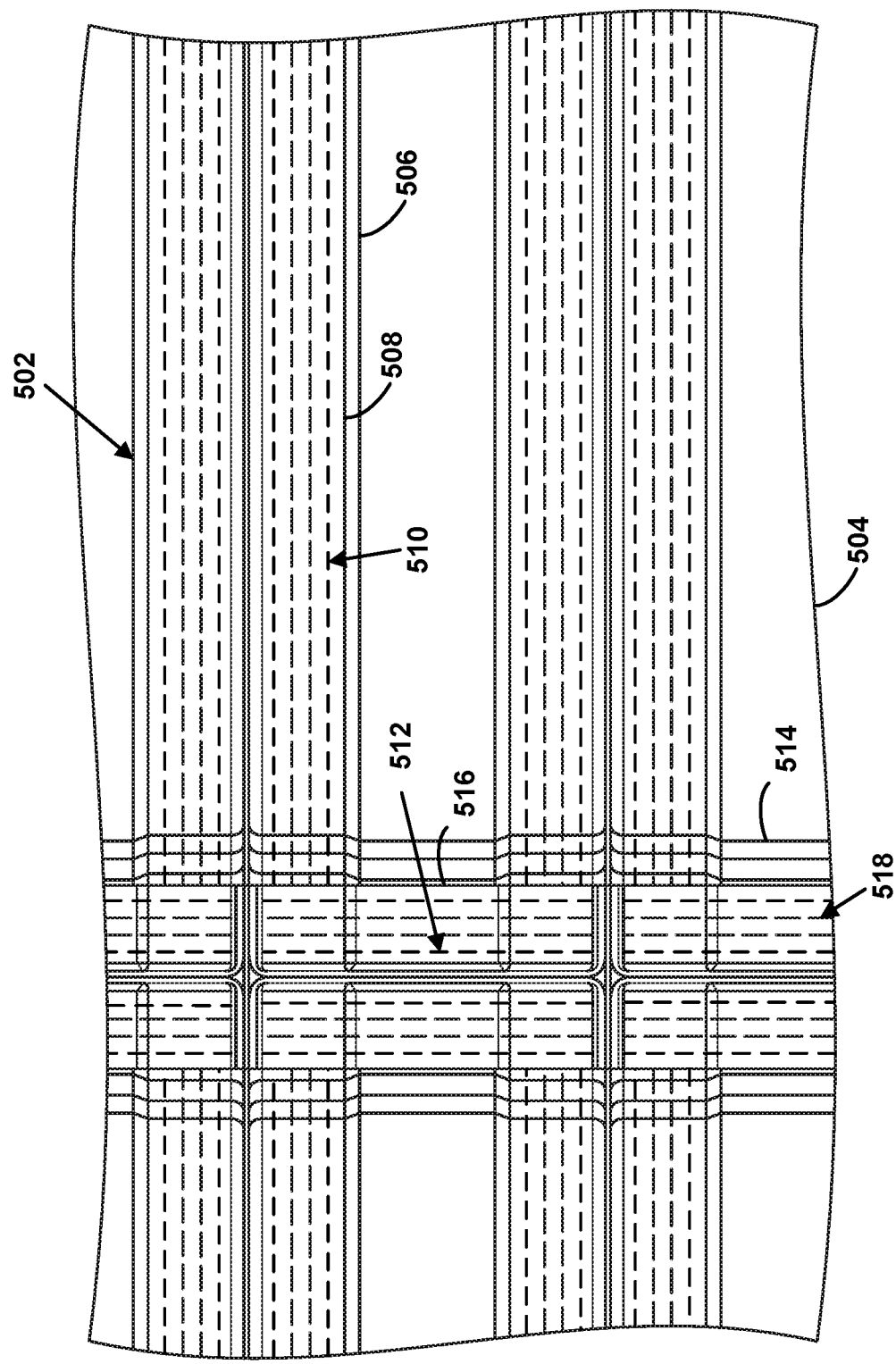
FIG. 5 illustrates stitching techniques, according to an example.

FIG. 5 illustrates stitching techniques, according to an example. As shown in FIG. 5, a stringer 502 can be stitched to a skin 504 of an aircraft wing. For example, during a stringer stitching operation, skin 504, a stringer base charge 506, and a first stringer flange 508 of stringer 502 can be stitched together using stringer stitching 510. Stringer stitching 510 can be provided along an entire length of first stringer flange 508 or along a portion of first stringer flange 508. Stringer stitching 510 can capture skin 504, stringer base charge 506, and first stringer flange 508.

As further shown in FIG. 5, a composite shear tie 512 can be stitched to skin 504, a tear strap 514, and stringer 502. For example, during a shear tie stitching operation, a first shear-tie flange 516, skin 504, tear strap 514, and first stringer flange 508 can be stitched together using shear-tie stitching 518. Shear-tie stitching 518 can be provided along an entire length of first shear-tie flange 516 or along a portion of first shear-tie flange 516. Shear-tie stitching 518 can capture skin 504, tear strap 514, and first shear-tie flange 516. Additionally, at the intersection of stringer 502 and composite shear tie 512, shear-tie stitching 518 can capture skin 504, tear strap 514, stringer base charge 506, first stringer flange 508, and first shear-tie flange 516.

Figure 6:
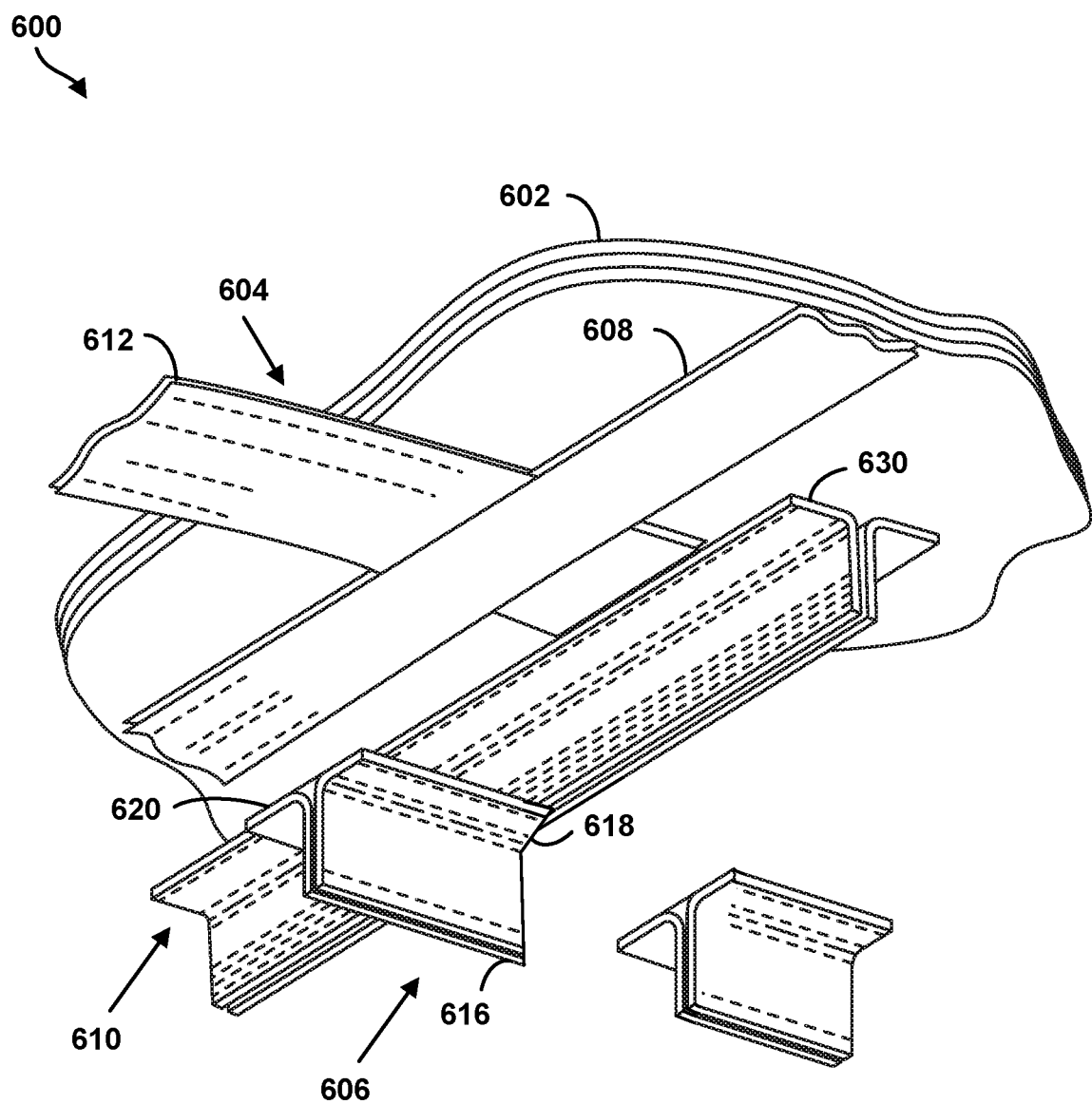
FIG. 6 illustrates a partial view of an assembly for connecting a rib of an aircraft wing to a skin of an aircraft wing, according to an example.

FIG. 6 illustrates a partial view of another assembly 600 for connecting a rib of an aircraft wing to a skin 602 of the aircraft wing, according to an example. Assembly 600 can, for example, be used for connecting a rib of plurality of ribs 112 of FIG. 1 to lower skin 106 or upper skin 108. As shown in FIG. 6, like the assembly 200 of FIG. 2, assembly 600 includes a discontinuous base charge 604, a composite shear tie 606, a stringer base charge 608, and a stringer 610. Further, composite shear tie 606 includes a shear-tie web 616, a first shear-tie flange 618 extending from a first side of shear-tie web 616, and a second shear-tie flange 620 extending from a second side of shear-tie web 616. Still further, stringer 610 includes a first stringer flange 630.

However, composite shear tie 606 differs from composite shear tie 206 of FIG. 2 in two ways. First, composite shear tie 206 includes first shear-tie tab 222 and second shear-tie tab 238, whereas, composite shear tie 606 does not include any shear-tie tabs. Second, first shear-tie flange 218 and second shear-tie flange 220 are arranged to be stitched to and integrated with both first stringer flange 230 and first section 212, whereas, first shear-tie flange 618 and second shear-tie flange 620 are arranged to be stitched to a first section 612 of discontinuous base charge 604 but not to first stringer flange 630 of stringer 610.

Figure 7:
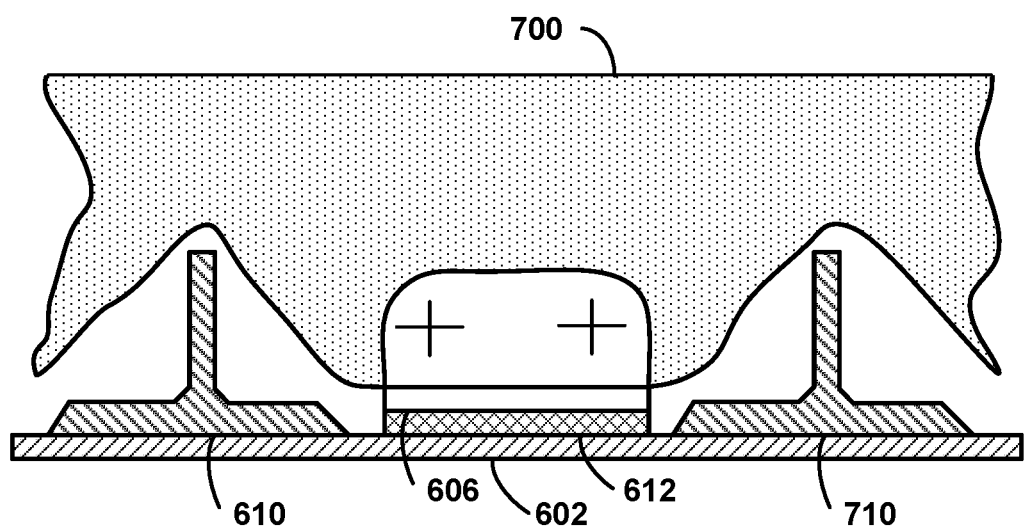
FIG. 7 illustrates a cross-sectional view of the assembly of FIG. 6.

FIG. 7 illustrates a cross-sectional view of assembly 600 of FIG. 6. As shown in FIG. 7, a rib 700 can be fastened to composite shear tie 606. Composite shear tie 606 is positioned between stringer 610 and second stringer 710, but composite shear tie 606 does not contact any stringer flanges of stringer 610 or second stringer 710.

Figure 8:
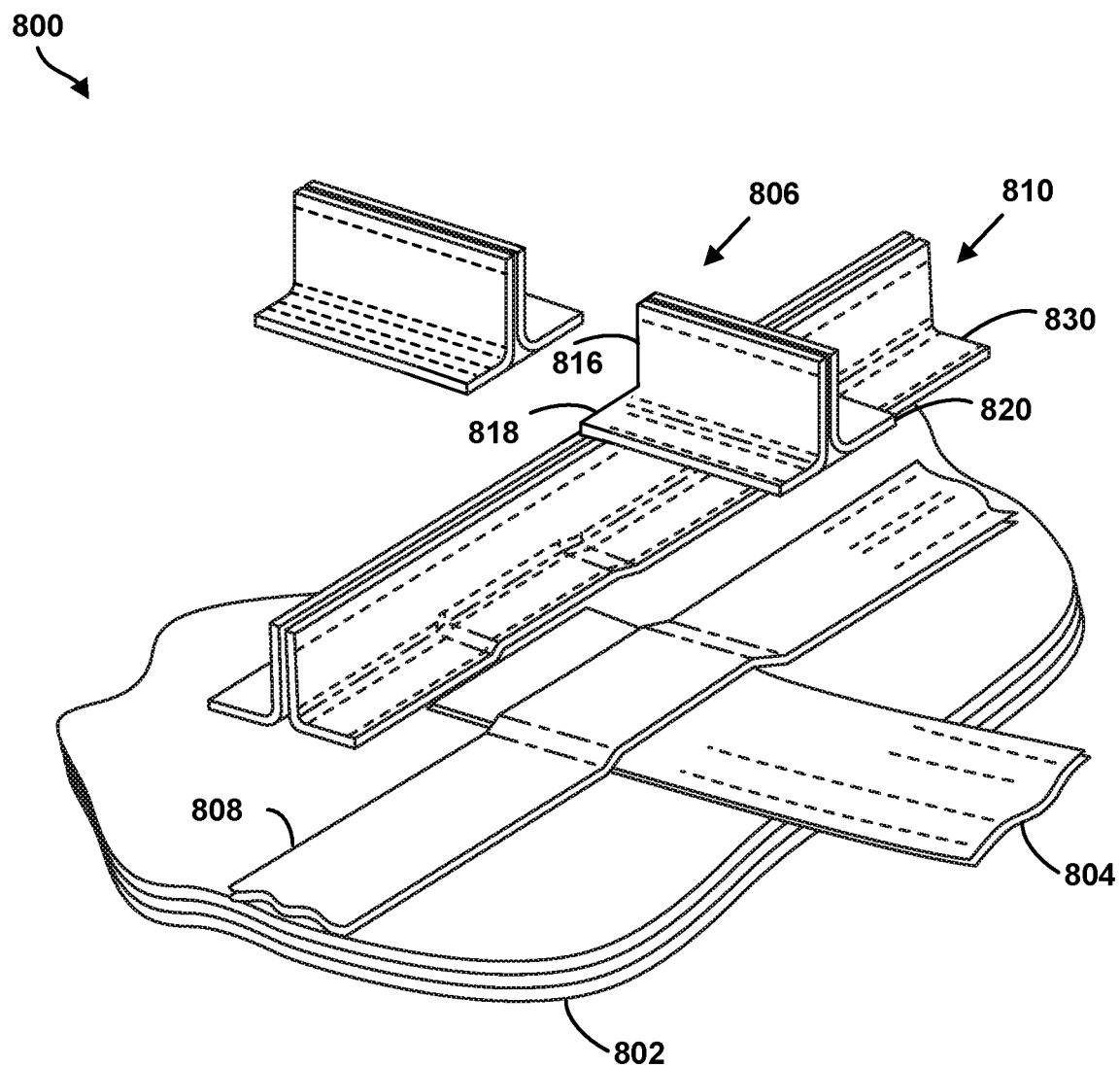
FIG. 8 illustrates a partial view of an assembly for connecting a rib of an aircraft wing to a skin of an aircraft wing, according to an example.

FIG. 8 illustrates a partial view of another assembly 800 for connecting a rib of an aircraft wing to a skin 802 of the aircraft wing, according to an example. Assembly 800 can, for example, be used for connecting a rib of plurality of ribs 112 of FIG. 1 to lower skin 106 or upper skin 108. As shown in FIG. 8, like the assembly 300 of FIG. 3, assembly 800 includes a continuous tear strap 804, a composite shear tie 806, a stringer base charge 808, and a stringer 810. Further, composite shear tie 806 includes a shear-tie web 816, a first shear-tie flange 818 extending from a first side of shear-tie web 816, and a second shear-tie flange 820 extending from a second side of shear-tie web 816. Still further, stringer 810 includes a first stringer flange 630.

However, composite shear tie 806 differs from composite shear tie 306 of FIG. 3 in two ways. First, composite shear tie 306 includes first shear-tie tab 322 and second shear-tie tab 238, whereas, composite shear tie 806 does not include any shear-tie tabs. Second, first shear-tie flange 318 and second shear-tie flange 320 are arranged to be stitched to and integrated with both first stringer flange 330 and continuous tear strap 304, whereas, first shear-tie flange 818 and second shear-tie flange 820 are arranged to be stitched to continuous tear strap 804 but not to first stringer flange 830 of stringer 810.

Figure 9:
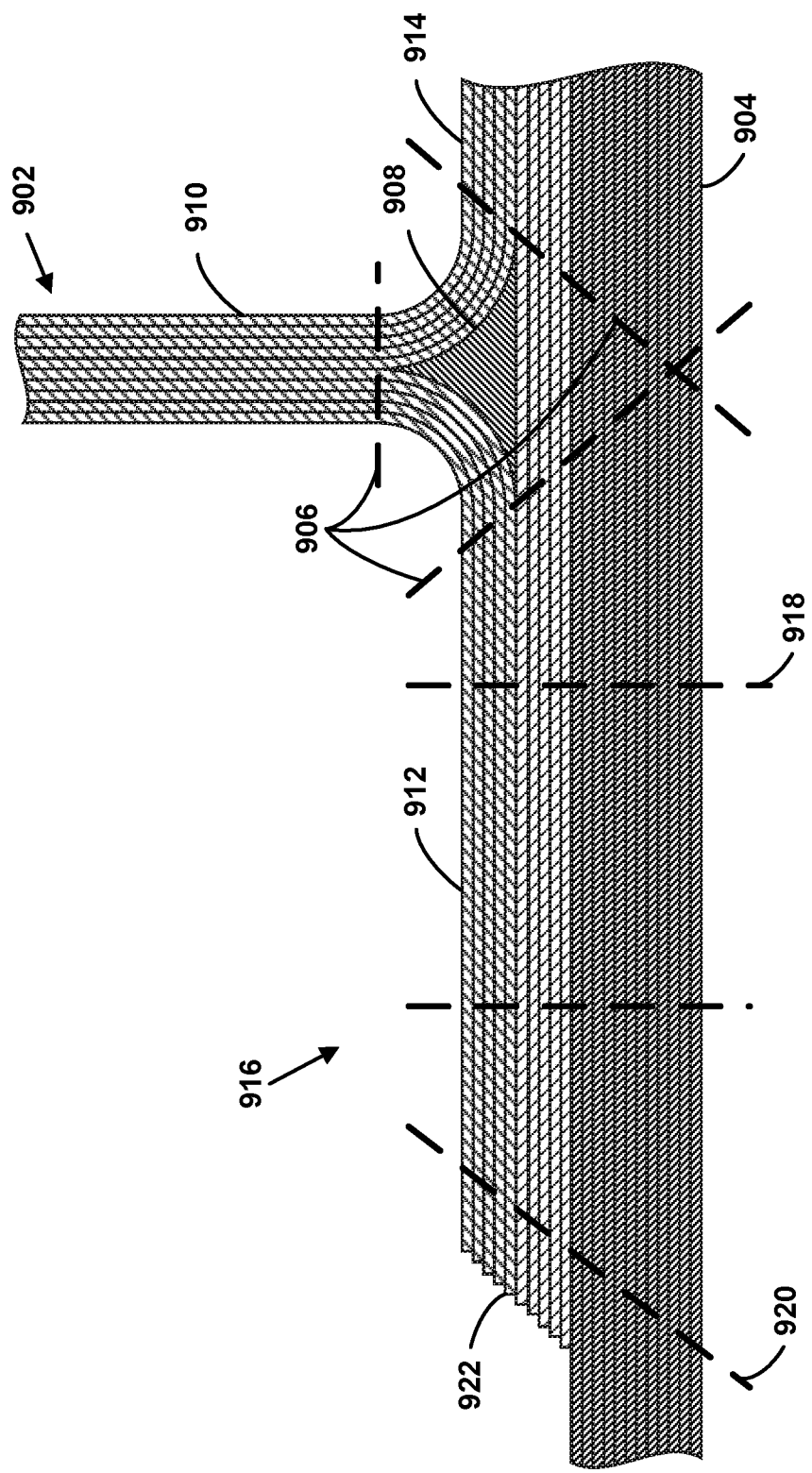
FIG. 9 illustrates additional stitching techniques, according to an example.

FIG. 9 also illustrates stitching techniques. As shown in FIG. 9, a composite shear tie 902 can be stitched to a skin 904 using fillet stitching 906 that encapsulates a fillet region 908 formed at a junction between a shear-tie web 910, a first shear-tie flange 912, and a second shear-tie flange 914. Fillet stitching 906 can prevent any fillet delamination from spreading into shear-tie web 910, first shear-tie flange 912, and second shear-tie flange 914.

As further shown in FIG. 9, composite shear tie 902 can be stitched to skin 904 using flange stitching 916 provided along a length of first shear-tie flange 912. Flange stitching 916 includes a flange-interior stitch 918, which can prevent damage in first shear-tie flange 912 from growing and causing first shear-tie flange 912 to separate from skin 904. Flange stitching 916 also includes a flange-edge stitch 920. First shear-tie flange 912 includes a slanted outer edge 922 that slants in a first direction, and flange-edge stitch 920 slants in the first direction. Flange-edge stitch 920 can help prevent damage that occurs in another area of skin 904 from weakening an interface between composite shear tie 902 and skin 904.

The stitching techniques of FIG. 9 also provide support directly adjacent to the shear-tie radius, increasing the capability of the structure. Whereas, when separate composite ribs are fabricated with an internal flange that is bolted to the skin with a perpendicular interface, the bolts are put further away from the shear-tie radius, increasing stresses on the shear-tie radius and reducing the structures capability. The internal flange can cause such composite ribs to be weight prohibitive. Hence, the stitching techniques of FIG. 9, for example, facilitate a weight-competitive composite assembly.

Figure 10:
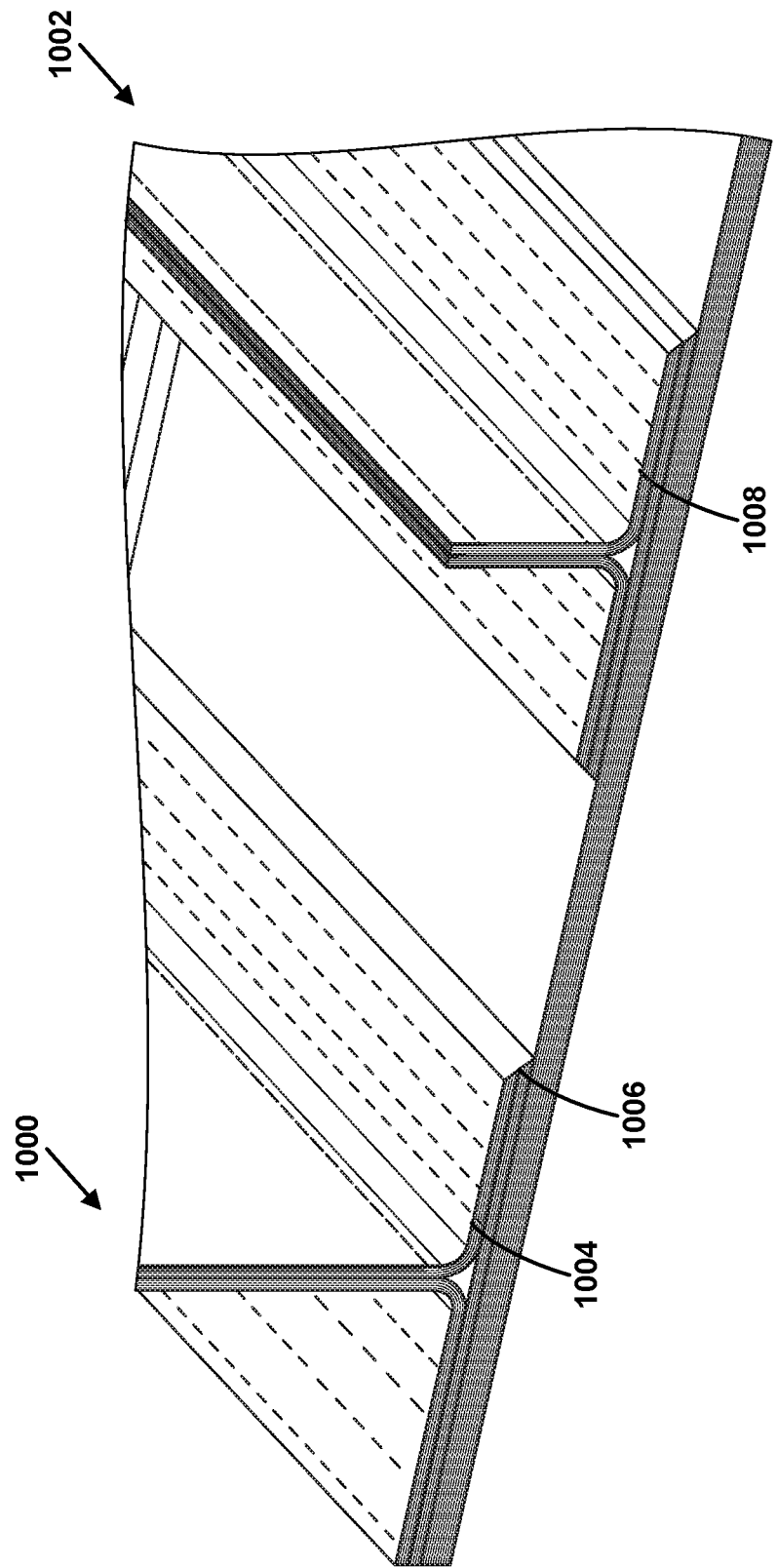
FIG. 10 illustrates two different flange edge configurations, according to an example.

FIG. 10 illustrates two different flange edge configurations, according to an example. More specifically, FIG. 10 depicts a first flange edge configuration 1000 and a second flange edge configuration 1002 that can be utilized for a shear-tie flange of a composite shear tie or a stringer flange of a stringer.

As shown in FIG. 10, first flange edge configuration 1000 can include a first flange 1004 having an overlapping edge 1006 that covers edges of plies beneath an uppermost ply of first flange 1004. For instance, first flange 1004 can be a stringer flange, and overlapping edge 1006 can cover the ends of one or more stringer-flange plies and the ends of one or more stringer-base-charge plies. Alternatively, first flange 1004 can be a shear-tie flange, and overlapping edge 1006 can cover the ends of one or more shear-tie-flange plies and the ends of one or more tear-strap plies.

As further shown in FIG. 10, second flange edge configuration 1002 includes a second flange 1008. Unlike first flange 1004, however, second flange 1008 does not include an overlapping edge 1006. Instead, second flange 1008 can be net molded, with ends of one or more plies of second flange 1008 being covered with resin. Second flange edge configuration 1002 may be easier to manufacture than first flange edge configuration. Accordingly, it may be beneficial to apply first flange edge configuration 1000 rather than second flange edge configuration 1002 in high electromagnetic threat level areas of an aircraft wing.

Figure 11:
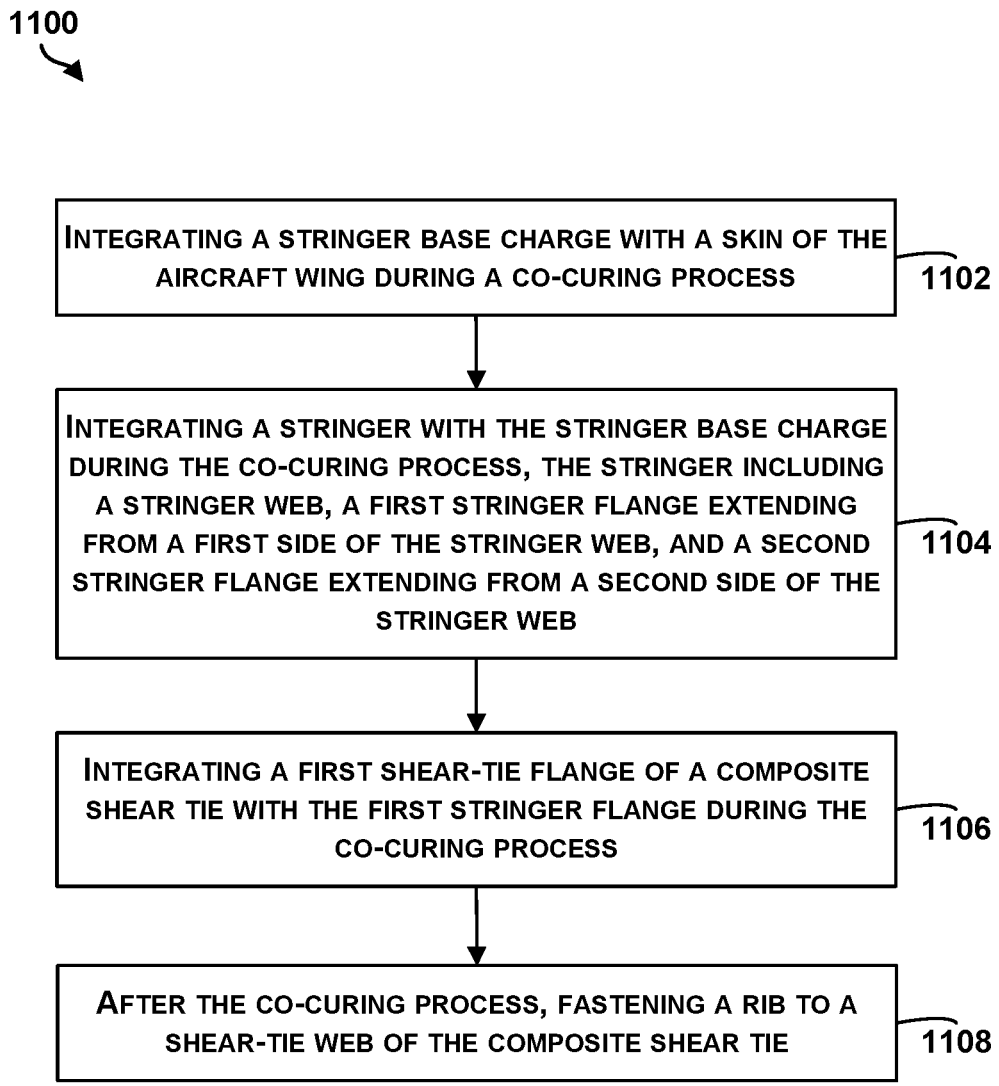
FIG. 11 shows a flowchart of a method, according to an example.

FIG. 11 shows a flowchart of a method 1100, according to an example. Method 1100 shown in FIG. 11 presents an embodiment of a method that, for example, could be carried out to assemble any of the aircraft wings described herein, such as aircraft wing 100 of FIG. 1. Method 1100 could be carried out by one or more operators and/or one or more robotic devices.

Method 1100 can include one or more operations, functions, or actions as illustrated by one or more of blocks 1102-1108. Although these blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 1102, method 1100 includes integrating a stringer base charge with a skin of the aircraft wing during a co-curing process. The skin can be an upper skin or a lower skin of the aircraft wing. At block 1104, method 1100 includes integrating a stringer with the stringer base charge during the co-curing process. The stringer includes a stringer web, a first stringer flange extending from a first side of the stringer web, and a second stringer flange extending from a second side of the stringer web. At block 1106, the method 1100 includes integrating a first shear-tie flange of a composite shear tie with the first stringer flange during the co-curing process. In line with the discussion above, the co-curing process can involve stitching or otherwise adhering the first shear tie, the stringer, and the stringer base charge to the skin; placing the skin, the stringer base charge, the stringer, and the shear tie in their assembled state in an oven; and curing the skin, the stringer base charge, the stringer, and the composite shear tie together in the oven.

At block 1108, the method 1100 includes, after the co-curing process, fastening a rib to a shear-tie web of the composite shear tie. The fastening at block 1108 can involve inserting a fastener through a hole in the shear-tie web and a hole in the rib. The fastening at block 1108 can be carried out by a robotic device having a movable base and a robotic arm.

Figure 12:
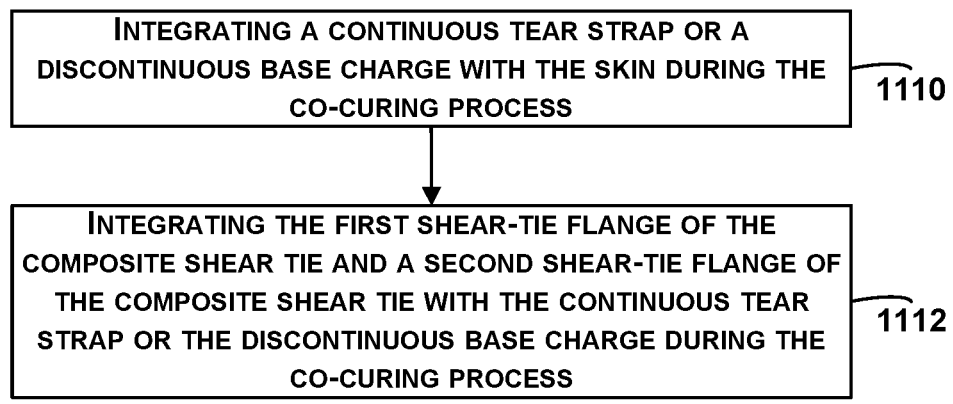
FIG. 12 shows additional operations that can be carried out in conjunction with the method shown in FIG. 11, according to an example.

FIG. 12 shows additional operations that can be carried out in conjunction with method 1100 of FIG. 11, according to an example. Blocks 1110 and 1112 of FIG. 12 could be performed prior to block 1108 of FIG. 11.

At block 1110, FIG. 12 includes integrating a continuous tear strap or a discontinuous base charge with the skin during the co-curing process. If a continuous tear strap is integrated with the skin, the stringer base charge can overlay the continuous tear strap. Alternatively, if the discontinuous base charge is integrated with the skin, the discontinuous base charge can include a first section and a second section that are separated by the stringer base charge.

At block 1112, FIG. 12 includes integrating the first shear-tie flange of the composite shear tie and a second shear-tie flange of the composite shear tie with the tear strap during the co-curing process.

Method 1100, as described with reference to FIGS. 11 and 12, can involve stitching plies of the stringer web together. Further, method 1100 can involve stitching plies of the shear-tie web together. Further, method 1100 can involve positioning the skin, the stringer with the stringer base charge, the composite shear tie, the continuous tear strap or the discontinuous base charge in an assembly tool. The assembly tool can hold the components in place relative to one another, so as to facilitate stitching the components together.

Further, method 1100 can involve stitching the first stringer flange, the stringer base charge, and the skin together, and stitching the first shear-tie flange, the continuous tear strap or the discontinuous base charge, and the skin together. At an intersection of the stringer and the composite shear tie, the first shear-tie flange, the first stringer flange, the stringer base charge, the continuous tear strap or discontinuous base charge, and the skin can be stitched together. The stringer can be stitched to the stringer base charge prior to positioning the stringer and the stringer base charge within the assembly tool.

Further, method 1100 can involve co-curing the skin, the stringer, the stringer base charge, the composite shear tie, and the continuous tear strap or the discontinuous base charge in an oven. A front spar and a rear spar can also be co-cured with the components.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. An assembly for connecting a rib of an aircraft wing to a skin of the aircraft wing, the assembly comprising:
   a composite shear tie having a shear-tie web, a first shear-tie flange extending from a first side of the shear-tie web, a second shear-tie flange extending from a second side of the shear-tie web, and a first shear-tie tab extending from an end of the first side of the shear-tie web;

a stringer base charge stitched to and integrated with the skin; and a stringer overlaying the stringer base charge, the stringer comprising a stringer web, a first stringer flange extending from a first side of the stringer web, and a second stringer flange extending from a second side of the stringer web, wherein the first shear-tie flange is stitched to and integrated with the first stringer flange, wherein the composite shear-tie is stitched to the skin using fillet stitching, and wherein the fillet stitching encapsulates a fillet region formed at a junction between the shear-tie web, the first shear-tie flange, and the second shear-tie flange.

2. The assembly of claim 1, wherein the first shear-tie tab is stitched to and integrated with the first side of the stringer web.

3. The assembly of claim 2, wherein the first shear-tie tab is stitched to and integrated with the first stringer flange.

4. The assembly of claim 3, wherein the first shear-tie tab comprises a plurality of shear-tie tab plies, wherein the first shear-tie flange comprises a plurality of shear-tie flange plies stitched to and integrated with the first stringer flange, and wherein the plurality of shear-tie tab plies are interweaved with the plurality of shear-tie flange plies of the first shear-tie flange.

5. The assembly of claim 1, further comprising a tear strap stitched to and integrated with the skin, wherein the first shear-tie flange and the second shear-tie flange are stitched to and integrated with the tear strap.

6. The assembly of claim 5, wherein the tear strap is a continuous tear strap, and wherein the stringer base charge overlays the continuous tear strap.

7. The assembly of claim 6, wherein the skin is a lower skin.

8. The assembly of claim 5, wherein during a co-curing process: the tear strap and the stringer base charge are integrated with the skin, and the first shear-tie flange is integrated with the first stringer flange.

9. The assembly of claim 1, further comprising a discontinuous base charge stitched to and integrated with the skin, the discontinuous base charge having a first section and a second section that are separated by the stringer base charge.

10. The assembly of claim 9, wherein the skin is an upper skin.

11. The assembly of claim 1, wherein the shear-tie web comprises a plurality of shear-tie web plies, and wherein the shear-tie web comprises through-thickness stitching holding the plurality of shear-tie web plies together, the through-thickness stitching provided along a length of the shear-tie web.

12. The assembly of claim 1, wherein a longitudinal axis of the composite shear tie is oblique to a longitudinal axis to the stringer.

13. An aircraft wing comprising:
a skin;
a composite shear tie having a shear-tie web, a first shear-tie flange extending from a first side of the shear-tie web, a second shear-tie flange extending from a second side of the shear-tie web, and a first shear-tie tab extending from an end of the first side of the shear-tie web;

a stringer base charge stitched to and integrated with the skin; and a stringer overlaying the stringer base charge, the stringer comprising a stringer web, a first stringer flange extending from a first side of the stringer web, and a second stringer flange extending from a second side of the stringer web, wherein the first shear-tie flange is stitched to and integrated with the first stringer flange, wherein the composite shear-tie is stitched to the skin using fillet stitching, and wherein the fillet stitching encapsulates a fillet region formed at a junction between the shear-tie web, the first shear-tie flange, and the second shear-tie flange.

14. The aircraft wing of claim 13, wherein the first shear-tie tab is stitched to and integrated with the first side of the stringer web.

15. The aircraft wing of claim 14, wherein the first shear-tie tab is stitched to and integrated with the first stringer flange.

16. A method of fabricating and assembling an aircraft wing, the method comprising:
integrating a stringer base charge with a skin of the aircraft wing during a co-curing process;
integrating a stringer with the stringer base charge during the co-curing process, the stringer comprising a stringer web, a first stringer flange extending from a first side of the stringer web, and a second stringer flange extending from a second side of the stringer web;
integrating a first shear-tie flange of a composite shear tie with the first stringer flange during the co-curing process, wherein the composite shear tie comprises a shear-tie web, a first shear-tie flange extending from a first side of the shear-tie web, and a second shear-tie flange extending from a second side of the shear-tie web, wherein the composite shear tie is stitched to the skin using fillet stitching, and wherein the fillet stitching encapsulates a fillet region formed at a junction between the shear-tie web, the first shear-tie flange, and the second shear-tie flange; and
after the co-curing process, fastening a composite rib to a shear-tie web of the composite shear tie.

17. The method of claim 16, further comprising:
integrating a continuous tear strap or a discontinuous base charge with the skin during the co-curing process; and
integrating the first shear-tie flange of the composite shear tie and the second shear-tie flange of the composite shear tie with the continuous tear strap or the discontinuous base charge during the co-curing process.

18. The assembly of claim 1, wherein the composite shear tie is stitched to the skin using flange stitching, wherein the flange stitching comprises at least one flange stitch provided along a length of the first shear-tie flange.

19. The aircraft wing of claim 13, wherein the composite shear-tie is stitched to the skin using flange stitching, and wherein the flange stitching comprises at least one flange stitch provided along a length of the first shear-tie flange.

20. The assembly of claim 18, wherein the at least one flange stitch comprises a flange-interior stitch and a flange-edge stitch, wherein the first shear-tie flange comprises a slanted outer edge that slants in a first direction, and wherein the flange-edge stitch slants in the first direction.

* * * * *